United States Patent
Aso et al.

(10) Patent No.: US 8,030,804 B2
(45) Date of Patent: Oct. 4, 2011

(54) LINEAR MOTOR AND LINEAR MOTOR COGGING REDUCTION METHOD

(75) Inventors: Toshiyuki Aso, Tokyo (JP); Hiroshi Kaneshige, Tokyo (JP); Akie Tanaami, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 12/675,577

(22) PCT Filed: Sep. 11, 2008

(86) PCT No.: PCT/JP2008/066453
§ 371 (c)(1),
(2), (4) Date: Feb. 26, 2010

(87) PCT Pub. No.: WO2009/035050
PCT Pub. Date: Mar. 19, 2009

(65) Prior Publication Data
US 2010/0207464 A1  Aug. 19, 2010

(30) Foreign Application Priority Data
Sep. 14, 2007   (JP) .................................. 2007-240143

(51) Int. Cl.
*H02K 41/03* (2006.01)

(52) U.S. Cl. .................................................. 310/12.25
(58) Field of Classification Search ............... 310/12.25
See application file for complete search history.

(56) References Cited

U.S. PATENT DOCUMENTS

| 4,638,192 | A  | * | 1/1987  | von der Heide | 310/12.25 |
| 4,908,533 | A  | * | 3/1990  | Karita et al. | 310/12.28 |
| 5,910,691 | A  | * | 6/1999  | Wavre | 310/12.18 |
| 6,713,899 | B1 | * | 3/2004  | Greubel et al. | 310/12.18 |
| 6,831,379 | B2 | * | 12/2004 | Ohto et al. | 310/12.18 |
| 7,170,202 | B2 | * | 1/2007  | Watarai et al. | 310/12.25 |
| 7,768,158 | B2 | * | 8/2010  | Kitamura et al. | 310/12.22 |
| 2003/0098620 | A1 |   | 5/2003  | Ohto et al. | |

FOREIGN PATENT DOCUMENTS

JP   55-68870 A   5/1980
(Continued)

OTHER PUBLICATIONS

International Search Report of PCT/JP2008/066453, mailing date of Dec. 9, 2008.
(Continued)

*Primary Examiner* — Burton Mullins
(74) *Attorney, Agent, or Firm* — Westerman, Hattori, Daniels & Adrian, LLP

(57) ABSTRACT

Provided is a linear motor capable of reducing cogging. The linear motor has a field magnet part 5 having a plurality of permanent magnets 21 arranged to form N and S poles alternately; a core 14 having a plurality of salient poles 14a, 14b and 14c arranged facing the field magnet part 5; and a three-phase coil 16 wound around the salient poles 14a, 14b and 14c of the core 14. At respective sides in the moving direction of an armature having the three-phase coil 16 and the core 14, auxiliary cores 18 made of a magnetic material are provided to sandwich the armature 10. The distance P1 between a center of each auxiliary core and a center of a center salient pole 14b is set to be substantially $\frac{1}{4} \times (2N+1) \times$ a magnetic pole pitch between N poles of the field magnet part 5 (N: an integer equal to or greater than 1).

8 Claims, 11 Drawing Sheets

FOREIGN PATENT DOCUMENTS

| | | | |
|---|---|---|---|
| JP | 62-203549 | A | 9/1987 |
| JP | 7-53427 | * | 12/1995 |
| JP | 7-53427 | Y2 | 12/1995 |
| JP | 2003-199319 | A | 7/2003 |
| JP | 2005-253259 | A | 9/2005 |
| WO | 01/80408 | A1 | 10/2001 |

OTHER PUBLICATIONS

International Preliminary Report on Patentability (Form PCT/IB/373) of International Application No. PCT/JP2008/066453 dated Apr. 7, 2010 with form PCT/ISA/237.

* cited by examiner

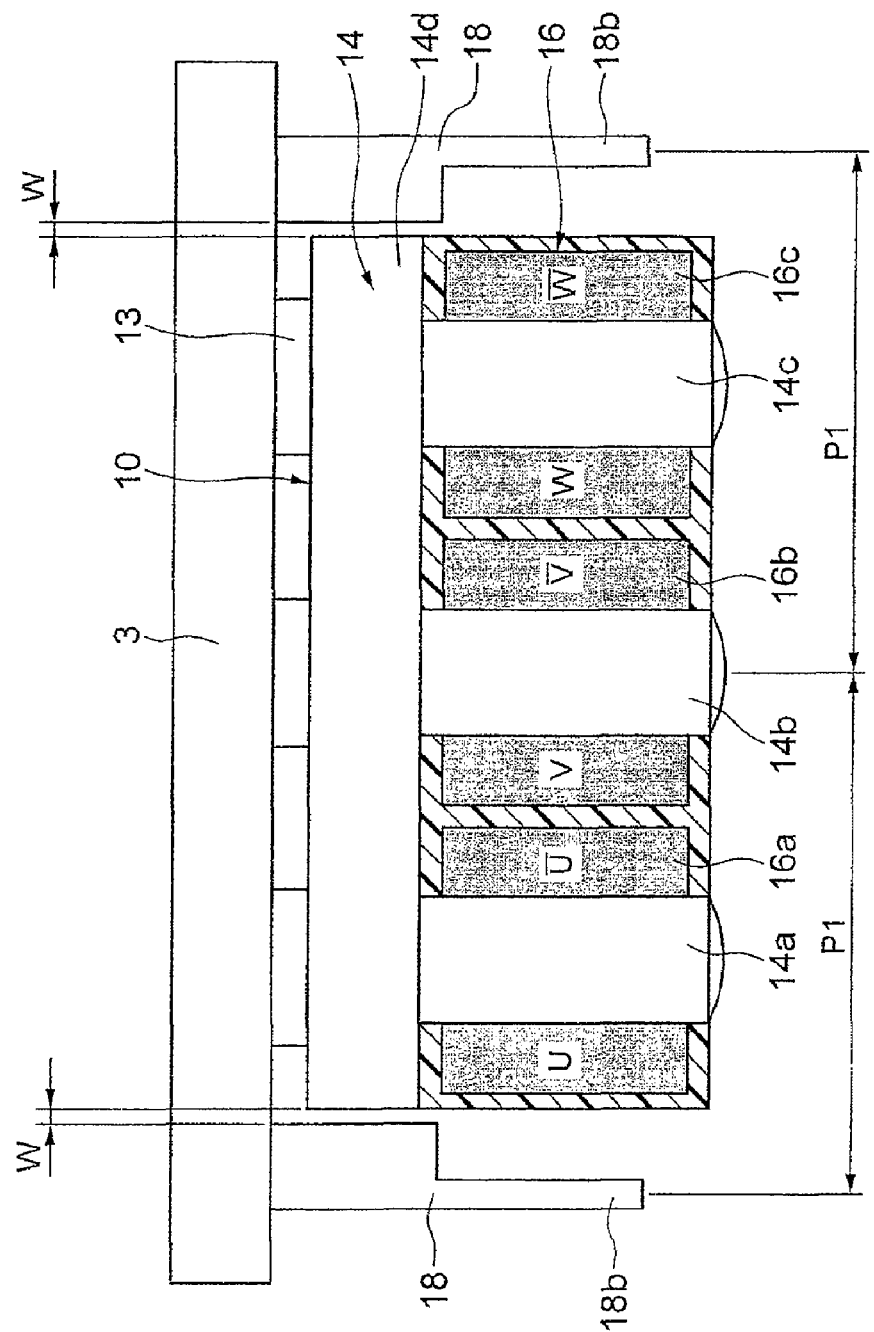

PRIOR ART

LINEAR MOTOR AND LINEAR MOTOR COGGING REDUCTION METHOD

TECHNICAL FIELD

The present invention relates to a linear motor having moving a mover which moves linearly relative to a stator and, more particularly, to a linear motor having an auxiliary core so as to reduce cogging of the linear motor and a cogging reduction method thereof.

BACKGROUND ART

In a linear motor, a mover is moved linearly relative to a stator. In the stator of the linear motor, a plurality of permanent magnets is arranged so as the N and S magnetic poles are formed alternately. On the stator, the mover is arranged via a gap. In order to maintain the gap constant between the stator and the mover, linear movement of the mover is guided by a guide device such as a linear guide or a bearing.

In the mover, a magnetic body core is provided facing the permanent magnets. The core has a plurality of salient poles projecting toward a field magnet part. The plural salient poles are wounded with three-phase coils of U, V and W phases, respectively. When a three-phase AC (alternate current) having a phase difference of 120 degrees is passed through the three-phase coils of U, V and W phases, a moving magnetic field is generated in the three-phase coils. By the action of the moving magnetic field produced by the three-phase coils and the magnetic field produced by the permanent magnets, the mover moves linearly.

The core is provided in order to strengthen the magnetic field generated by the coils. The core is made of a magnetic material such as silicon steel. Therefore, even while current is not passed through the coils, magnetic attraction is generated between the salient poles of the core and the permanent magnets. When the mover moves along the stator, the salient poles of the core are attracted by front permanent magnets or attracted back by rear permanent magnets due to the magnetic attraction. Therefore, the magnetic attraction added to the mover varies periodically per magnetic pole pitch of permanent magnets. This periodic variation in attraction is called cogging. Even if a current is passed through the coils, there remains cogging, which acts as disturbance.

As an approach to cancel cogging, as illustrated in FIG. 11, there is known a linear motor having auxiliary magnetic poles 2a and 2b of magnetic bodies provided at respective ends in the moving direction of the core 1 of the mover (see Patent documents 1 and 2). In this linear motor, the auxiliary magnetic poles 2a and 2b are provided to strengthen the magnetic flux of salient poles 1a and 1b at respective ends in the moving direction of the core 1. If the auxiliary magnetic poles 2a and 2b are not provided, a magnetic circuit of the salient poles 1a and 1b at the respective ends is difficult to form and the magnetic flux of the salient poles 1a and 1b at the respective ends becomes weaker than that of the center salient pole 1c. When the magnetic flux of the salient poles 1a and 1b at the respective ends becomes weak, the magnetic flux of the salient poles 1a and 1b and the magnetic flux of the center salient pole 1c are unbalanced to cause cogging. The auxiliary cores 2a and 2b are provided to strengthen the magnetic flux of the salient poles 1a and 1b at the respective ends and solve the problem of unbalancing.

[Patent Document 1] Japanese Utility Model Laid-Open No. 7-53427
[Patent Document 2] Japanese Patent Application Laid-Open No. 55-68870

DISCLOSURE OF THE INVENTION

Problems to be Solved by the Invention

However, when the auxiliary cores are provided to strengthen the magnetic flux of the salient poles at the respective ends of the core, the newly provided auxiliary cores cause cogging. In order to reduce cogging of the auxiliary cores, there is a need to take a new measure against the cogging. Thus, the conventional cogging reduction method is difficult to adopt as a general measure against cogging due to various intertwined factors.

The inventors have noted that the magneto-resistance at the salient pole in the center of the core is low, the magnetic flux is easily to pass, and a waveform of a cogging force generated in the whole core (see FIG. 7, the horizontal axis indicates the core phase and the vertical axis indicates the cogging force) is synchronous with a waveform of a cogging force generated in the center salient pole. Then, they have learned that the cogging force of the whole core can be reduced by generating a cogging force at the auxiliary cores having such a waveform as to cancel the waveform of the cogging force generated at the center salient pole.

The present invention was made in view of the foregoing and has an object to provide a linear motor and a linear motor cogging reduction method that are new and capable of reducing cogging.

Means for Solving the Problems

In order to solve the above-mentioned problems, for example, a linear motor includes a field magnet part having a plurality of permanent magnets arranged to form N and S poles alternately; a core having a plurality of salient poles arranged facing the field magnet part; a three-phase coil wound around the salient poles of the core; an armature having the three-phase coil and the core and moving linearly relative to the field magnet part; an auxiliary core of magnetic body provided on at least one side of the armature in a relative moving direction of the armature; and a distance between a center of the auxiliary core and a center of a center salient pole among the salient poles in the relative moving direction of the armature is set to be substantially $\frac{1}{4} \times (2N+1) \times$ a magnetic pole pitch between N-N poles of the field magnet part (N: an integer equal to or greater than 1).

In the linear motor of the example above, the auxiliary core and the core are separate components so as to form a gap between the auxiliary core and the core or to interpose a non-magnetic material therebetween.

In the linear motor of the example above, the auxiliary core has a tip end part and a base part, and a thickness of the tip end part in the moving direction is smaller than a thickness in the moving direction of the base part.

In the linear motor of the example above, the tip end part of the auxiliary core is cut off at a side facing the core so that the thickness in the moving direction becomes smaller.

In the linear motor of the example above, the auxiliary core is provided at each side of the armature in the moving direction in such a manner that the armature is sandwiched between the auxiliary cores.

In the linear motor of the example above, the three-phase coil is a coil set having coils of U, V and W phases wound around the salient poles, respectively, arranged in the moving direction and the center salient pole is a salient pole positioned in center in the moving direction among the three salient poles.

In another exemplary embodiment of the invention a linear motor includes a field magnet part having a plurality of permanent magnets arranged to form N and S poles alternately; a core having a plurality of salient poles arranged facing the field magnet part; a three-phase coil wound around the salient poles of the core; an armature having the three-phase coil and the core and moving linearly relative to the field magnet part; an auxiliary core of magnetic body provided on at least one side of the armature in a relative moving direction of the armature; and the auxiliary core and the core being separate components so as to make a gap between the core and the auxiliary core or to interpose a non-magnetic material therebetween.

In yet another exemplary embodiment of the invention a linear motor cogging reduction method having a field magnet part having a plurality of permanent magnets arranged to form N and S poles alternately, a core having a plurality of salient poles arranged facing the field magnet part, a three-phase coil wound around the salient poles of the core, an armature having the three-phase coil and the core and moving linearly relative to the field magnet part, and an auxiliary core of magnetic body provided on at least one side of the armature in a relative moving direction of the armature, the linear motor cogging reduction method comprising: placing the auxiliary core in such a manner that a distance between a center of the auxiliary core and a center of a center salient pole among the salient poles in the relative moving direction of the armature is substantially $\frac{1}{4} \times (2N+1) \times$ a magnetic pole pitch between N-N poles of the field magnet part (N: an integer equal to or greater than 1).

EFFECTS OF THE INVENTION

In some exemplary embodiments of the invention, as the auxiliary core is arranged substantially at the position an odd multiple of a magnetic pole pitch×¼ away from the center salient pole, it is possible to generate such a cogging force at the auxiliary core as to cancel the cogging force generated by the center salient force. This means that it is possible to reduce the cogging of the whole core.

In some exemplary embodiments of the invention, as the gap is made between the core and the auxiliary core or the non-magnetic material is interposed therebetween, it is possible to prevent the salient poles at the respective ends of the core and the auxiliary core from forming a magnetic circuit. Hence, it is possible to reduce the influence of the conventional measure against cogging that strengthens the magnetic flux of the salient poles at the respective ends of the core, thereby to reduce the cogging reliably. In addition, as the core and auxiliary core are separate components, even when there is an error in design values in dimensions of the manufactured auxiliary core, or besides the components of the linear motor, a component that causes cogging is provided between the stator and the mover, there is no need to manufacture the core again, of which manufacturing process is complicated, and only need to change the auxiliary core.

In some exemplary embodiments of the invention, the auxiliary core can be separated from the core while maintaining the pitch between the auxiliary core and the center salient pole constant. Hence, it is possible to prevent the salient poles at the respective ends of the core and the auxiliary core from forming a magnetic circuit. Besides, the base part is thicker than the tip end part, the auxiliary core can be easily attached to the table or the like. Further, as the attraction applied to the auxiliary core can be reduced, it becomes possible to reduce a load on a guide part for guiding linear movement of the mover.

In some exemplary embodiments of the invention, it is possible to shorten the entire length of the core including the auxiliary core while the gap is made between the salient poles at the respective ends of the core and the auxiliary core.

In some exemplary embodiments of the invention, it is possible to evenly reduce the cogging force generated by the center salient pole, in a balanced manner, with use of the auxiliary cores provided at the respective sides of the armature.

In some exemplary embodiments of the invention, it is possible to reduce the cogging force at the center salient pole among the three salient poles effectively.

In some exemplary embodiments of the invention, as the gap is made between the core and the auxiliary core or the non-magnetic material is interposed therebetween, it is possible to prevent the salient poles at the respective ends of the core and the auxiliary core from forming a magnetic circuit. Hence, it is possible to reduce the influence of the conventional measure against cogging that strengthens the magnetic flux of the salient poles at the respective ends of the core, thereby to reduce the cogging reliably. In addition, as the core and auxiliary core are separate components, even when there is an error in design values in dimensions of the manufactured auxiliary cores, or besides the components of the linear motor, a component that causes cogging is provided between the stator and the mover, there is no need to manufacture the core again, of which manufacturing process is complicated, and only need to change the auxiliary cores.

In some exemplary embodiments of the invention, as the auxiliary core is arranged substantially at the position an odd multiple of a magnetic pole pitch×¼ away from the center salient pole, it is possible to generate such a cogging force at the auxiliary core as to cancel the cogging force generated by the center salient pole. This means that it is possible to reduce the cogging of the whole core.

BRIEF DESCRIPTION OF THE DRAWINGS

FIG. 3 is a cross sectional view taken along a moving direction of an armature.

REFERENCE NUMERALS

5 . . . field magnet part, 10 . . . armature, 14 . . . core, 14a, 14b, 14c . . . salient poles, 14b . . . center salient pole, 16 . . .

three-phase coil, 18a . . . base part of auxiliary core, 18b . . . tip end part of auxiliary core, 18 . . . auxiliary core, 21 . . . permanent magnet, P1 . . . distance from the center of auxiliary core to the center of center salient pole, P2 . . . magnetic pole pitch between N poles of field magnet part

MODE FOR CARRYING OUT THE INVENTION

Figure 1:
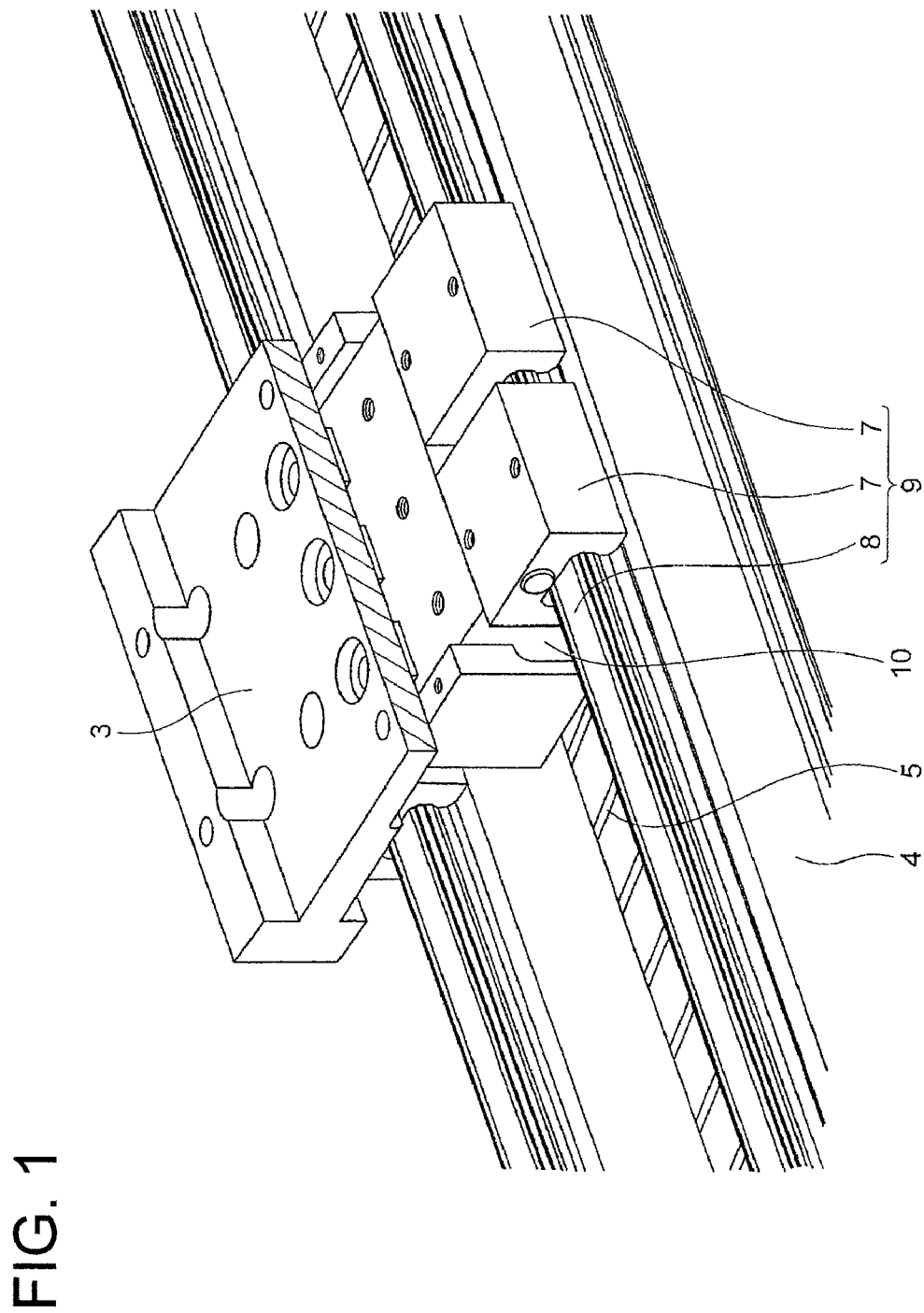
FIG. 1 is a perspective view of a liner motor according to an exemplary embodiment of the present invention (including a partial cross sectional view of a table).
Figure 2:
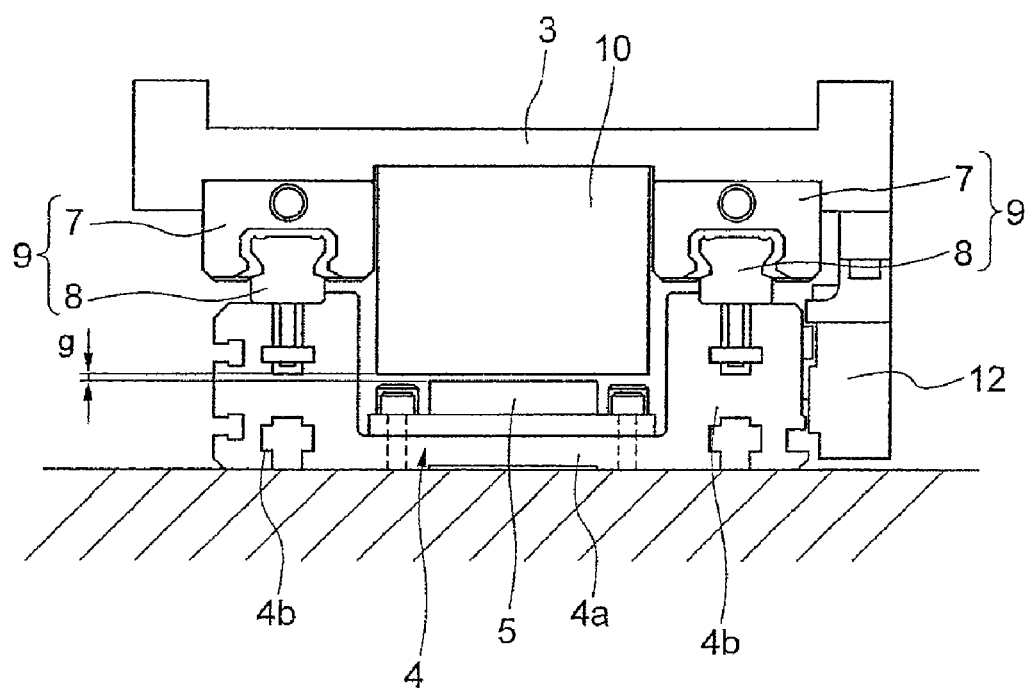
FIG. 2 is a front view of the linear motor.

With reference to the attached drawings, exemplary embodiments of the present invention will be described in detail below. FIG. 1 is a perspective view of a linear motor according to an exemplary embodiment of the present invention (including a cross sectional view of a table) and FIG. 2 is a front view thereof. On an elongating base 4, a field magnet part 5 is mounted as a stator of the linear motor. On the base 4, linear guides 9 for guiding linear movement of a table 3 are mounted. The table 3 is mounted on the upper surfaces of moving blocks 7 of the linear guides 9. On the lower surface of the table 3, an armature 10 is suspended as a mover of the linear motor between the linear guides 9 of both sides. As illustrated in the front view of FIG. 2, a gap g is made between the armature 10 and the field magnet part 5. The linear guides 9 maintain this gap constant irrespective of movement of the table 3.

The base 4 has a bottom wall 4a and a pair of side walls 4b provided at the respective sides in the width direction of the bottom wall 4a. On the upper surface of the bottom wall 4a, raceway rails 8 of the linear guides 9 are mounted. On each raceway rail 8, moving blocks 7 are mounted slidably. Between the raceway rail 8 and each moving block 7, a plurality of balls (not shown) is interposed rollably. In the moving block 7, a circuit-shaped ball circulation passage is provided for circulating the balls. When the moving block 7 slides relative to the raceway rail 8, the plural balls rolls therebetween and circulate in the ball circulation passage. This enables smooth sliding of the moving block 7 relative to the raceway rail 8.

On the upper surface of each moving block 7 of the linear guide 9, the table 3 is mounted. The table 3 is made of a non-magnetic material such as aluminum. On the table 3, a moving object is mounted. Also, on the table 3, a position detecting unit 12 such as a liner scale is mounted for detecting the position of the table 3 relative to the base 4. A position signal detected by the position detecting unit 12 is sent to a driver that drives the linear motor. The driver controls a current to be supplied to the armature 10 so as to move the table 3 in accordance with a position instruction from an upper-level controller.

FIG. 3 is a cross sectional view taken along the moving direction of the armature 10. On the lower surface of the table 3, the armature is provided via an insulating material 13. The armature 10 has a core 14 made of a magnetic material such as silicon steel and a three-phase coil 16 wound around salient poles 14a, 14b and 14c of the core 14. The core 14 has a base plate 14d mounted on the lower surface of the table 3 and the comb teeth shaped salient poles 14a, 14b and 14c projecting downward from the base plate 14d. The number of the salient poles 14a, 14b and 14c is a multiple of 3 and in this exemplary embodiment, it is 3. The salient poles 14a, 14b and 14c are arranged in the moving direction of the armature 10 with a fixed pitch kept therebetween. The three salient poles 14a, 14b and 14c are wound with coils 16a, 16b and 16c of U, V and W phases. The three-phase coil 16 carries three-phase AC having a phase difference of 120 degrees. After the three-phase coil 16 is wound around the salient poles 14a, 14b and 14c, it is sealed with resin.

On the lower surface of the table 3, a pair of auxiliary cores 18 is mounted sandwiching the armature 10. The auxiliary cores 18 and the core 14 of the armature 10 are separate components. And, a gap W is created between the core 14 and each of the auxiliary cores 18. The auxiliary core 18 is made of a magnetic material such as silicon steel or rolled steel of general structure. As no coil is wound on each auxiliary core 18, the auxiliary core 18 does not function as an electromagnet.

Figure 4A:
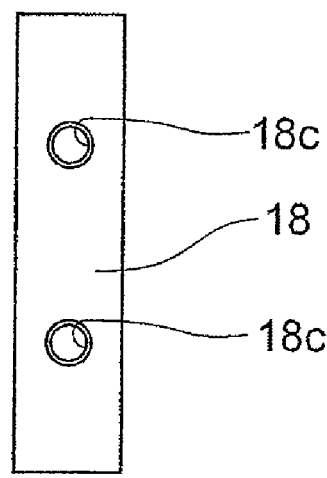
FIGS. 4A to 4B are detailed views of an auxiliary core (FIG. 4A is a plan view and FIG. 4B is a side view).
Figure 4B:
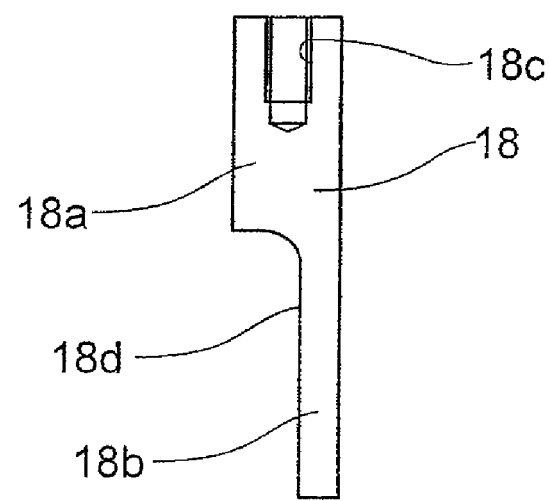

FIGS. 4A and 4B are detailed view of the auxiliary core 18. FIG. 4A is a plan view of the auxiliary core 18 and FIG. 4B is a side view of the auxiliary core 18. The auxiliary core 18 is approximately plate shaped as a whole. The lateral width of the auxiliary core 18 is almost equal to that of the core 14. The auxiliary core 18 has a base part 18a mounted onto the table 3 and a tip end part 18b provided closer to the field magnet part 5. In the base part 18a, a screw hole 18c is formed for mounting the auxiliary core 18 onto the table 3. A side of the tip end part 18b facing the armature 10 is cut over the entire length in the width direction. This cut part 18d is provided to make the tip end part 18b thinner than the base part 18a.

As illustrated in FIG. 3, as the gap W is given between the core 14 and the auxiliary cores 18, it becomes possible to prevent the salient poles 14a and 14c at the respective ends of the core 14 and the auxiliary cores 18 from forming a magnetic circuit. Hence, it is possible to reduce the influence of the conventional cogging reduction method that strengthens the magnetic flux of the salient poles 14a and 14c at the respective ends of the core 14.

In addition, as the tip end part 18b of each auxiliary core 18 is made thin, it is possible to separate the auxiliary core 18 from the core 14 as much as possible while keeping the pitch P1 between the auxiliary core 18 and the center salient pole 14b constant. Hence, it is possible to prevent the salient poles 14a and 14c at the respective ends of the core 14 and the auxiliary cores 18 from forming a magnetic circuit.

Figure 5:
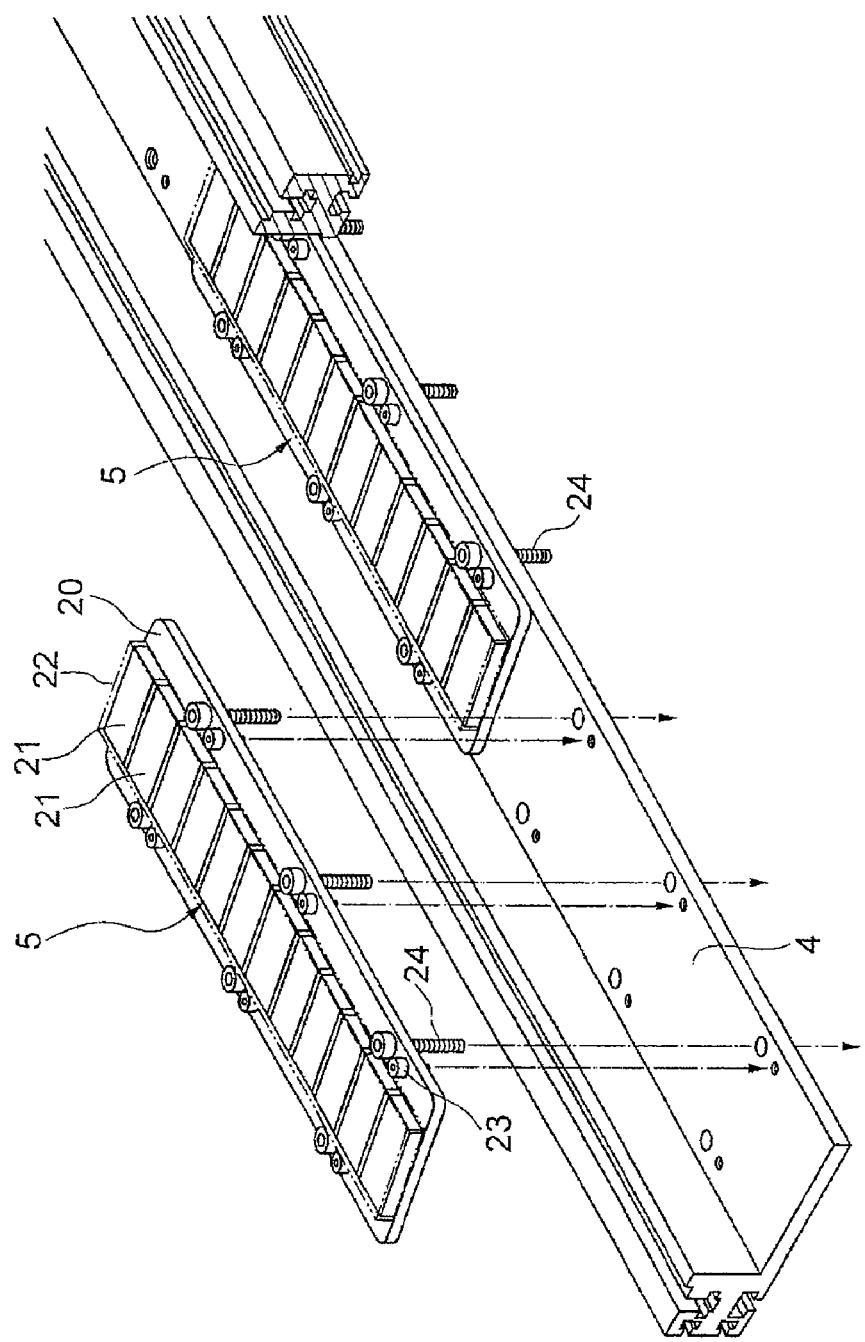
FIG. 5 is a perspective view of a field magnet part.

FIG. 5 illustrates the field magnet part 5 mounted on the upper surface of the base 4. The field magnet part 5 has a thin-plate-shaped yoke 20 and a plurality of permanent magnets 21 arranged in a line on the yoke 20. Each permanent magnet 21 is a rare earth magnet such as neodymium magnet having high coercive force. Either one of N pole and S pole is formed at the front side of the plate-shaped permanent magnet 21, and the other is formed at the back side thereof. The permanent magnets 21 are arranged on the yoke 20 in such a manner that N and S poles are formed alternately in the longitudinal direction. The permanent magnets 21 are fixed to the yoke 20 by adhesion.

The yoke 20 is made of a magnetic material such as silicon steel or rolled steel of general structure. The yoke 20 is formed like an elongating plate. The permanent magnets 21 fixed onto the yoke 20 are covered with a cover plate 22 (indicated by the chain double-dashed line). The cover plate 22 is also fixed to the yoke 20 by adhesion. The yoke 20 to which the permanent magnets 21 and the cover plate 22 are fixed is mounted on the base 4 with use of a fixing part such as a bolt 23. The field magnet part 5 is unitized and a plurality of field magnet parts 5 is unitized in accordance with the length of the base 4 and mounted on the base 4. The base 4 to which the field magnet parts 5 is fixed is fixed to a bed (not shown) with use of a fixing part such as a bolt 24.

Figure 6:
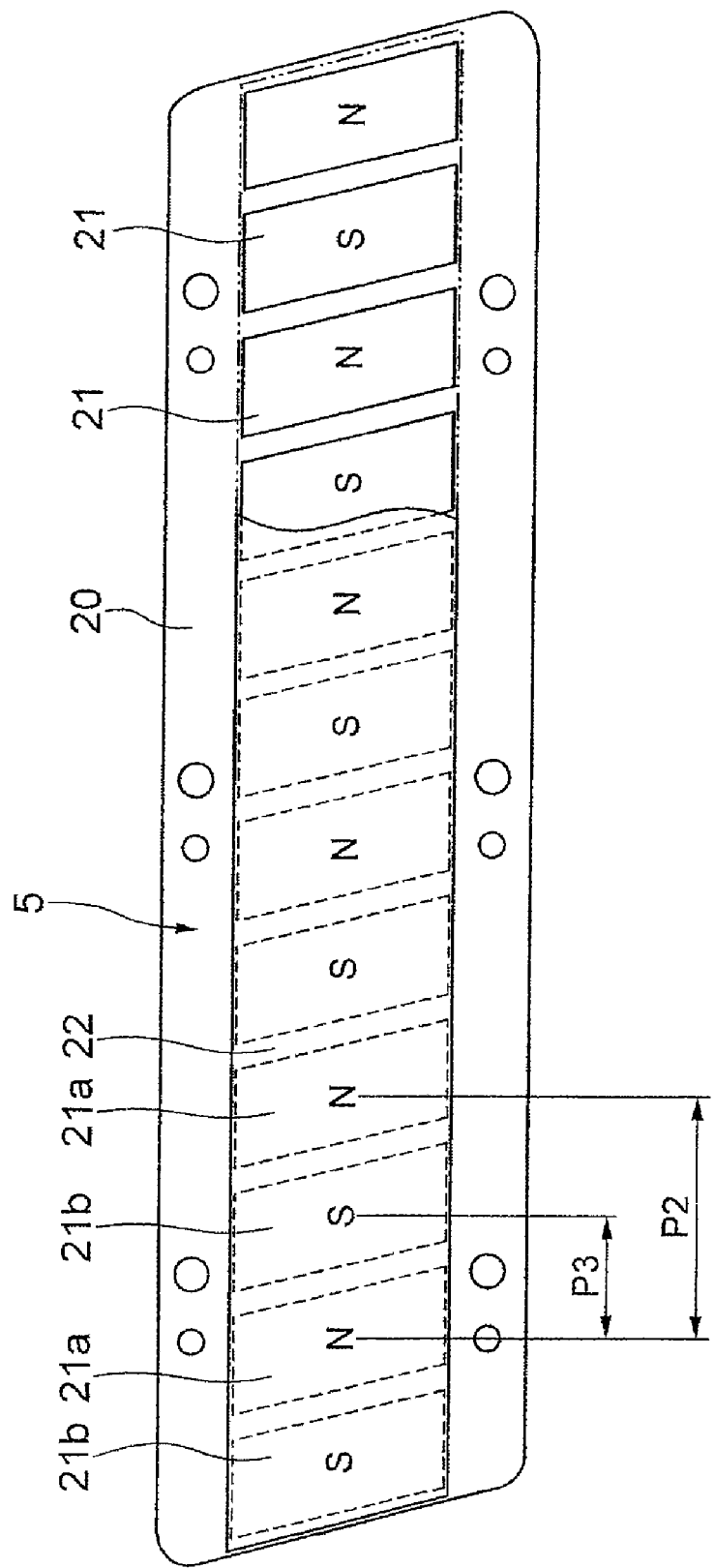
FIG. 6 is a plan view of the field magnet part.

FIG. 6 is a plan view of the field magnet part 5. In this exemplary embodiment, the plan shape of each permanent magnet 21 is parallelogram. The distance from the center of an N-pole permanent magnet 21a to the center of another N-pole permanent magnet 21a is a magnet pole pitch P2 between N-N poles of the field magnet part 5. Needless to say, the magnetic pole pitch P2 of N-N poles of the field magnet part is twice as long as the magnetic pole pitch P3 between N-S poles and equal to the magnetic pole pitch between S-S poles.

Figure 7:
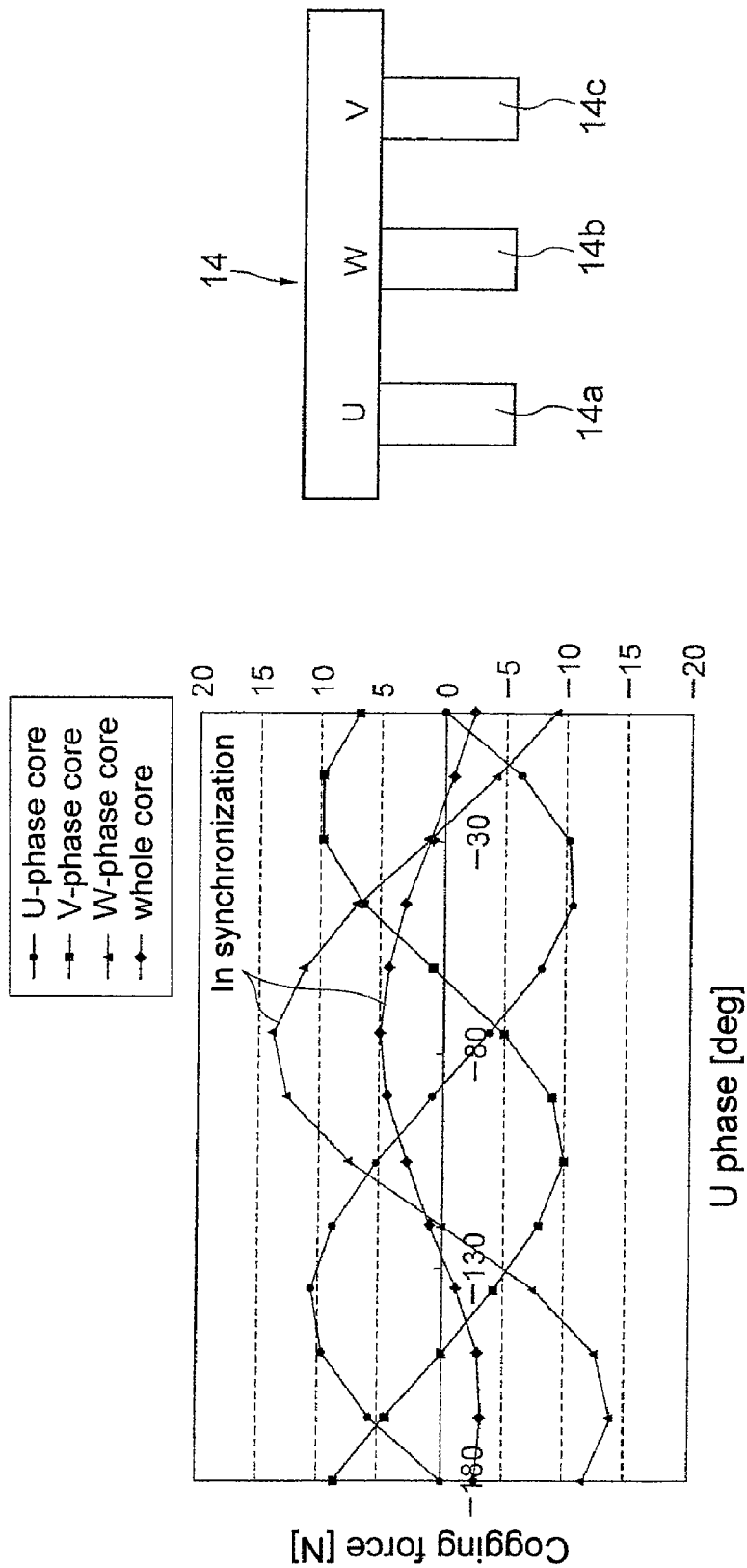
FIG. 7 is a graph showing cogging forces generated at salient poles.
Figure 8:
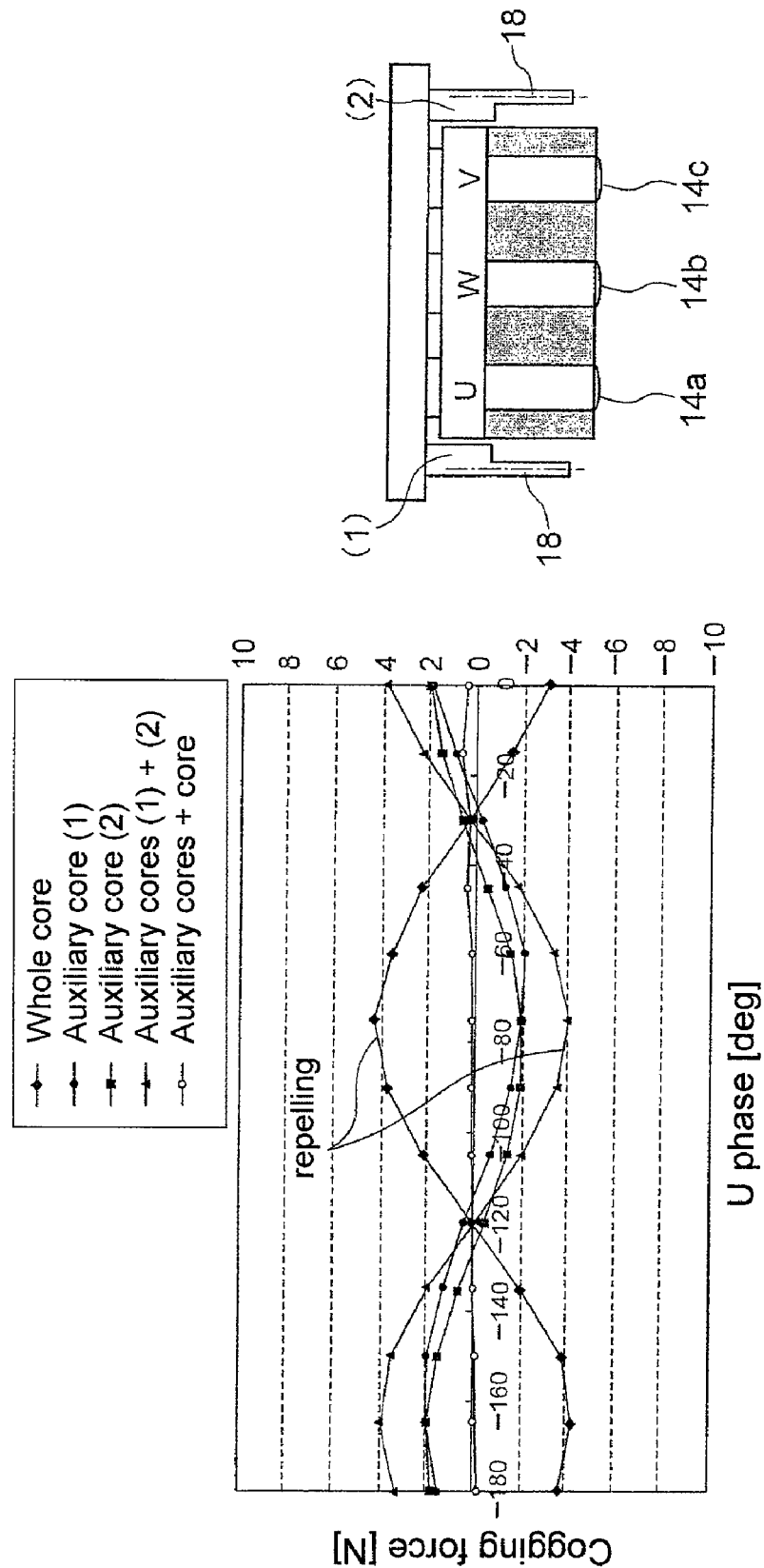
FIG. 8 is a graph showing a cogging force generated by the whole core and cogging forces generated by the auxiliary cores.
Figure 9:
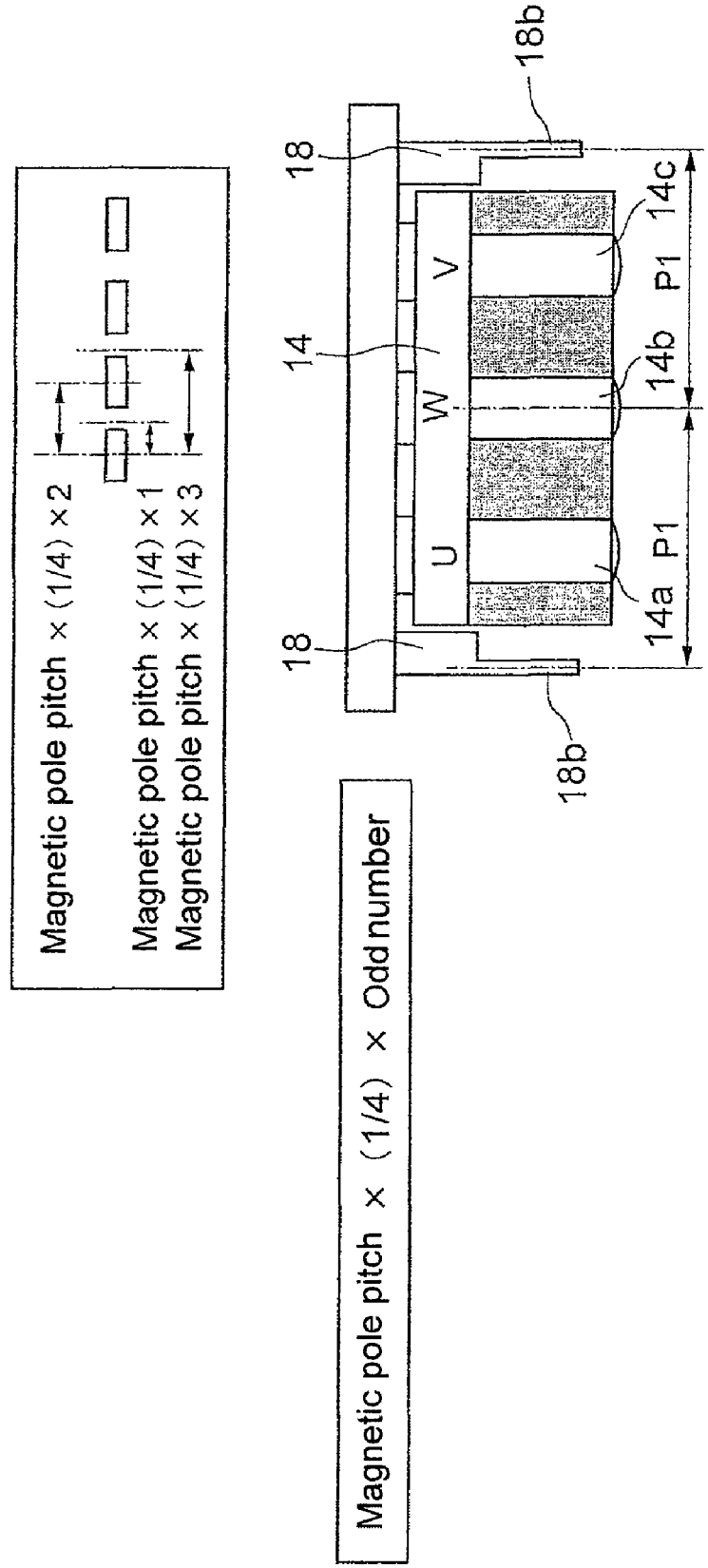
FIG. 9 is a view illustrating a relation between a magnetic pole pitch between N poles of the field magnet part and a distance P1 between the center of the center salient pole of W phase and the center of the auxiliary core.

With reference to FIGS. 7 to 9, a cogging reduction method according to the present invention will be described. When the core 14 made of magnetic material is moved over the permanent magnets 21 of the field magnet part 5, magnetic attraction is caused between the permanent magnets 21 and the core 14. Out of the magnetic attraction, a component that is generated in the moving direction of the armature 10 is relevant to cogging. A component perpendicular to the moving direction of the armature 10 (attraction in the vertical direction) is received by the linear guides 9 and is irrelevant to the cogging.

While no current is passed through the three-phase coil 16, the armature 10 is moved linearly relative to the field magnet part 5. Then, the salient poles 14a, 14b and 14c of the core 14 are attracted by front permanent magnets 21 or rear permanent magnets 21 in the moving direction. This periodic variation in attraction is cogging.

FIG. 7 is a graph showing the cogging force generated at each of the salient poles 14a, 14b and 14c when the armature 10 is moved from −180 to 0 electrical degrees (½ of the magnetic pole pitch between N poles). The cogging forces generated at the salient poles 14a, 14b and 14c of U, V and W phase are represented as sine curves of which the phases are 120-degree different from each other, like currents passing through the three-phase coils of U, V and W phases. If the amplitudes of the three sine curves are the same, the cogging force of the whole core obtained by combining cogging forces of the three salient poles 14a, 14b and 14c always becomes zero irrespective of the position of the armature 10. That is, no cogging is generated.

However, the magneto-resistance of the center salient pole 14b of W phase is the lowest and the magnetic flux can pass easily. When cogging forces of the salient poles of U, V and W phases are compared, the cogging force of the center salient pole 14b of W phase is the greatest and the cogging forces of the salient poles 14a and 14c at the respective ends are smaller. In view of this, the cogging force of the whole core is generated in synchronization with the cogging force of the center salient pole 14b of W phase. If the auxiliary cores 18 can generate such a cogging force that can cancel the cogging force of the salient pole of W phase, the cogging force of the whole core can be reduced.

FIG. 8 is a graph showing comparison between the waveform of the cogging force generated at the whole core and the waveforms of the cogging forces generated at the auxiliary cores 18. The waveforms of the cogging forces generated at the auxiliary cores (1) and (2) are phase-shifted by 90 electrical degrees from the waveform of the cogging force of the whole core and serves as waveforms that can reduce the cogging force of the whole core. Then, the cogging force waveform obtained by combining the waveforms of the auxiliary cores (1) and (2) is an inversion of the whole core waveform. Therefore, the cogging force obtained by combining the cogging forces of the whole core and the auxiliary cores (1) and (2) always becomes close to zero irrespective of the electrical angle of the armature 10.

Here, in order that the cogging force for canceling the cogging force of the whole core is generated by the auxiliary cores 18, the phase of the center salient pole 14b of W phase has only to be shifted by 90 electrical degrees from the phase of the auxiliary core 18. In other words, as illustrated in FIG. 9, the distance P1 from the center of the center salient pole 14b of W phase and the center of the tip end part 18b of the auxiliary core 18 is an odd multiple of one fourth of the magnetic pole pitch P2 between N-N poles of the field magnet part 5. If it is set to be an even multiple of one fourth of the magnetic pole pitch, the cogging force of the auxiliary core 18 strengthens the cogging force of the salient pole 14b of W phase.

Here, in consideration of a mounting space of auxiliary cores 18 or actual cogging occurrence, the distance P1 between the center of the salient pole 14b of W phase and the center of the auxiliary core 18 may be slightly shifted from an odd multiple of one fourth of the magnetic pole pitch. Such a case may be included in the scope of the present invention featuring that the distance P1 is substantially an odd multiple of one fourth of the magnetic pole pitch.

EXAMPLES

A linear motor is used of which the magnetic pole pitch between N-N poles of the field magnet part 5 is 39 mm. When this is applied to the formula shown in FIG. 9, the distance P1 between the center of the salient pole 14b of W phase and the center of the auxiliary core 18 is 39×(¼)×5=48.75 mm. In fact, the auxiliary core 18 is arranged at the position of 39× (¼)×4.8=46.8 mm. Then, cogging is compared between before and after mounting of the auxiliary core 18.

Figure 10A:
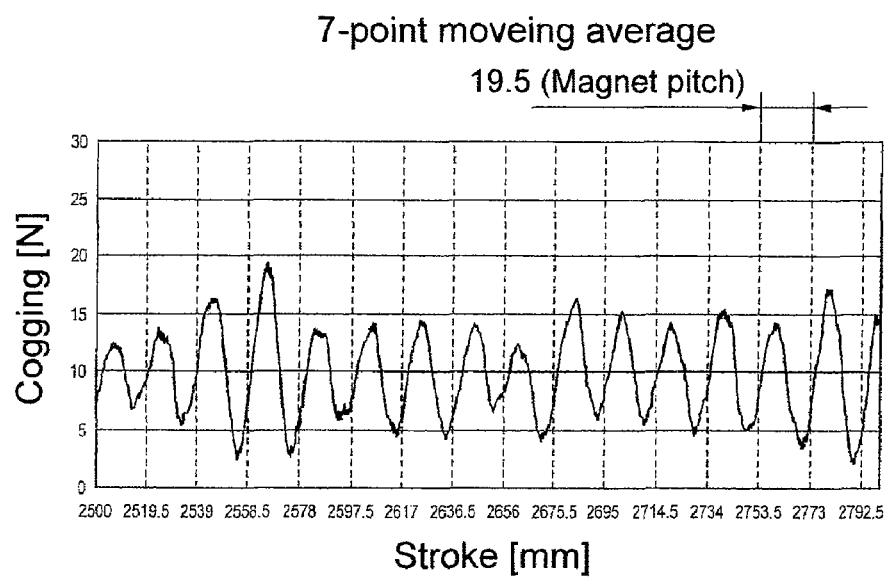
FIGS. 10A and 10B are graphs for comparing cogging before and after mounting of the auxiliary core (FIG. 10A illustrates the cogging before mounting of the auxiliary core and FIG. 10B illustrates the cogging after mounting of the auxiliary core).
Figure 10B:
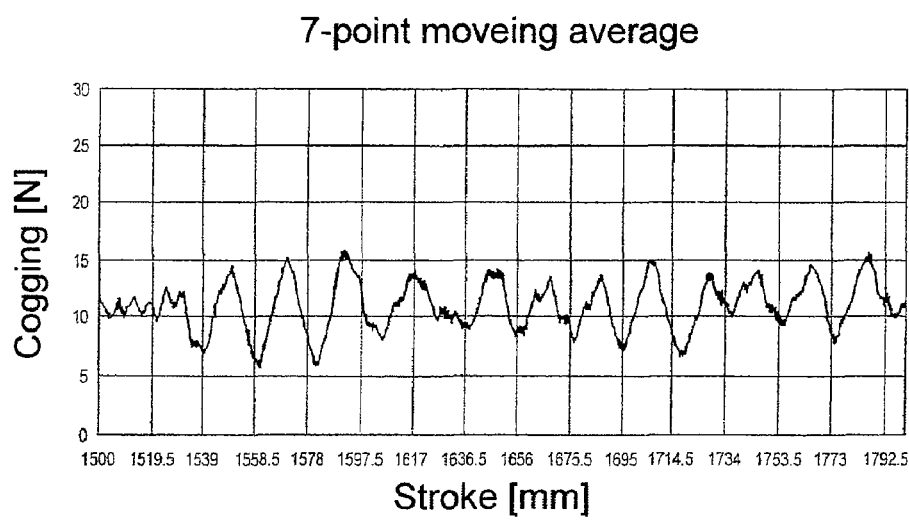
Figure 11:
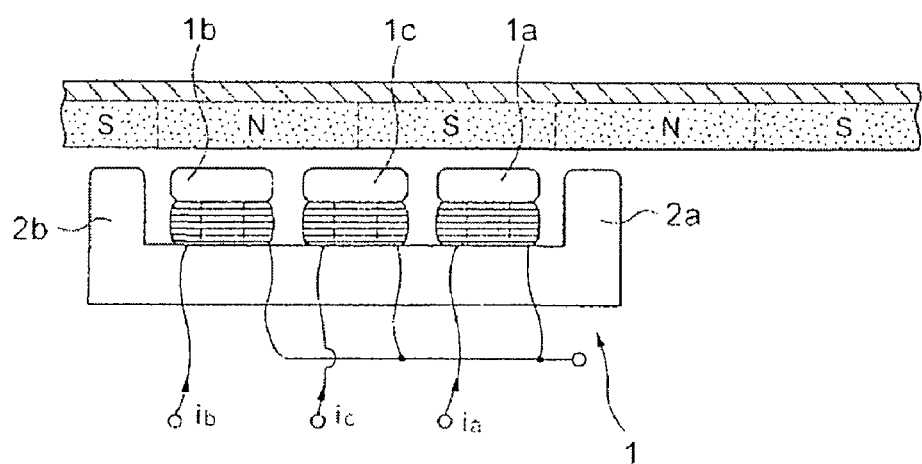
FIG. 11 is a schematic view illustrating a linear motor adopting the conventional measure against cogging.

FIGS. 10A and 10B illustrate results of cogging comparison. FIG. 10A illustrates the cogging before mounting of the auxiliary core 18 and FIG. 10B illustrates the cogging after mounting of the auxiliary core 18. These show that the cogging force can be reduced about 50% from 11.4 N to 5.86 N by mounting of the auxiliary core 18.

The present invention is not limited to the above-described exemplary embodiment and may be embodied in various forms without departing from the scope of the present invention. For example, when three salient poles form one set, two sets of salient poles, that is six salient poles, may be provided. In such a case, there are two center salient poles and the center of the two salient poles is treated as the center of the center salient pole. When totally nine salient poles are provided, the fifth salient pole from the end is treated as the center salient pole.

In addition, the auxiliary cores do not need to be provided at the respective sides of the armature, or one auxiliary core may be provided at one side of the armature. The tip end part of the auxiliary core does not need to be thin or may have a straight shape of cross section that does not vary from the base part to the tip end part. Between the auxiliary core and the core, a non-magnetic material maybe interposed in place of the gap. The auxiliary core may be provided at the side surface side of the table, not at the lower surface side of the table.

Further, although, in the above-described exemplary embodiment, the armature as the mover is moved and the field magnet part as the stator is fixed, the field magnet part may be moved and the armature may be fixed.

The present application is based on Japanese Patent Application No. 2007-240143 filed on Sep. 14, 2007, and its contents are incorporated by reference herein.

The invention claimed is:

1. A linear motor comprising:
   a field magnet part having a plurality of permanent magnets arranged to form N and S poles alternately;
   a core having a plurality of salient poles arranged facing the field magnet part;
   a three-phase coil wound around the salient poles of the core;

an armature having the three-phase coil and the core, said armature moving linearly relative to the field magnet part;

an auxiliary core having a magnetic body provided on at least one side of the armature in a relative moving direction of the armature; and a distance between a center of the auxiliary core and a center of a center salient pole among the salient poles in the relative moving direction of the armature which is set to be substantially $\frac{1}{4}\times(2N+1)\times$ a magnetic pole pitch between said N poles of the field magnet part (N: an integer equal to or greater than 1).

2. The linear motor of claim 1, wherein the auxiliary core and the core are separate components so as to form a gap between the auxiliary core and the core.

3. The linear motor of claim 2, wherein the gap contains a non-magnetic material.

4. The linear motor of claim 1, wherein the auxiliary core has a tip end part and a base part, and a thickness of the tip end part in the moving direction is smaller than a thickness in the moving direction of the base part.

5. The linear motor of claim 4, wherein the tip end part of the auxiliary core is cut off at a side facing the core so that the thickness in the moving direction becomes smaller.

6. The linear motor of claim 1, wherein the auxiliary core is provided at each side of the armature in the moving direction in such a manner that the armature is sandwiched between the auxiliary cores.

7. The linear motor of claim 1, wherein the three-phase coil is a coil set having coils of U, V and W phases wound around the salient poles, respectively, arranged in the moving direction and one of the plurality of salient poles is in a center position in the moving direction of the salient poles.

8. A linear motor cogging reduction method having a field magnet part having a plurality of permanent magnets arranged to form N and S poles alternately, a core having a plurality of salient poles arranged facing the field magnet part, a three-phase coil wound around the salient poles of the core, an armature having the three-phase coil and the core and moving linearly relative to the field magnet part, and an auxiliary core having a magnetic body provided on at least one side of the armature in a relative moving direction of the armature, the linear motor cogging reduction method comprising:

placing the auxiliary core in such a manner that a distance between a center of the auxiliary core and a center of a center salient pole among the salient poles in the relative moving direction of the armature is substantially $\frac{1}{4}\times(2N+1)\times$ a magnetic pole pitch between said N poles of the field magnet part (N: an integer equal to or greater than 1).

* * * * *